Nov. 15, 1927.  1,649,355

G. W. LINDSAY ET AL

BRACKET FOR RADIATORS

Filed July 16, 1925  2 Sheets-Sheet 1

INVENTORS
Griffith W. Lindsay
F. Hjalmar Nordenmalm
By Kay, Totten & Martin,
Attorneys.

Nov. 15, 1927. 1,649,355
G. W. LINDSAY ET AL
BRACKET FOR RADIATORS
Filed July 16, 1925  2 Sheets-Sheet 2

INVENTORS
Griffith W. Lindsay
F. Hjalmar Nordenmalm
By Kay, Totten & Martin,
Attorneys Patented Nov. 15, 1927.

1,649,355

UNITED STATES PATENT OFFICE.

GRIFFITH W. LINDSAY AND HJALMAR NORDENMALM, OF BUTLER, PENNSYLVANIA, ASSIGNORS TO STANDARD STEEL CAR COMPANY, OF PITTSBURGH, PENNSYLVANIA, A CORPORATION OF PENNSYLVANIA.

BRACKET FOR RADIATORS.

Application filed July 16, 1925. Serial No. 43,948.

Our invention relates to brackets for supporting radiator pipes and the like, such as the piping used in the steam heating of railway cars, although the invention is applicable in other relations, such, for example, as an ordinary pipe bracket.

One object of our invention is to provide a bracket which is capable of maintaining one or more pipes in the desired location, but which will permit movement of the pipes relative to the bracket, either individually or as a unit, without excessive distortion of the pipes or of the bracket.

Another object of our invention is to provide a bracket suitable for supporting a group of pipes which are non-uniformly spaced and which will permit expansion and contraction of said pipes under changes in temperature.

Still another object of our invention is to provide a pipe bracket of such form that pipes may be conveniently connected thereto.

Figure 1:
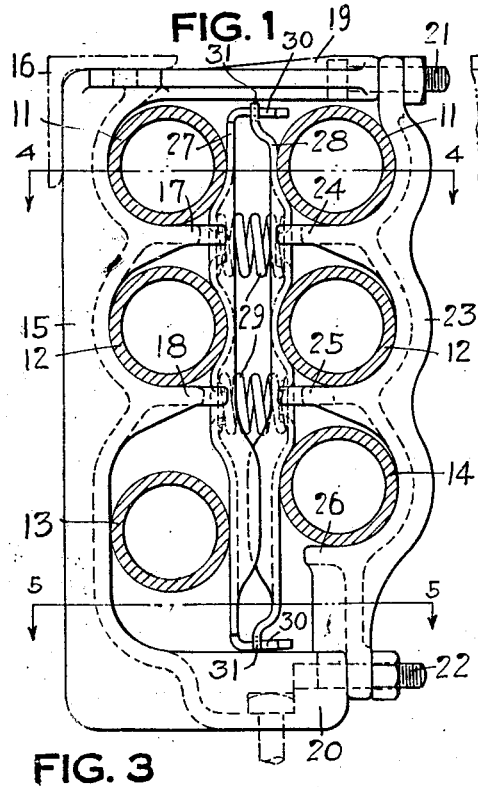
Figure 2:
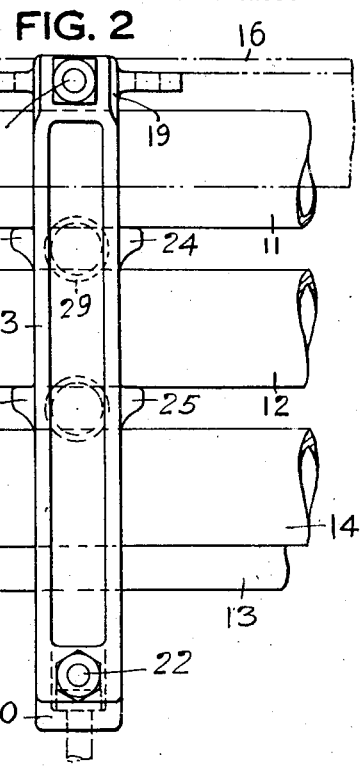
Figure 3:
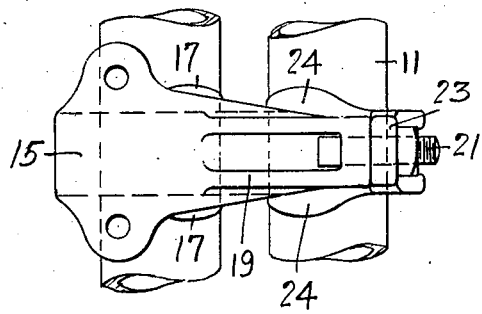
Figure 4:
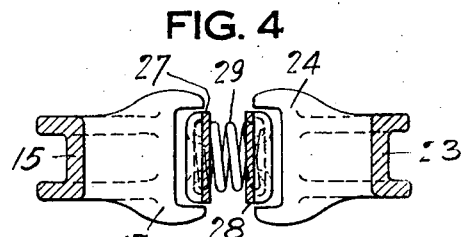
Figure 5:
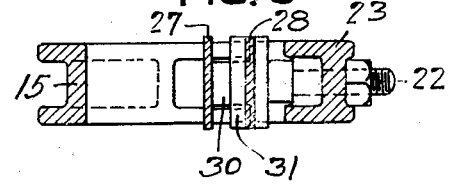
Figure 6:
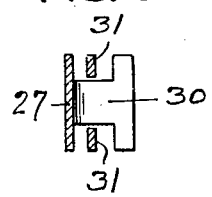
Figure 7:
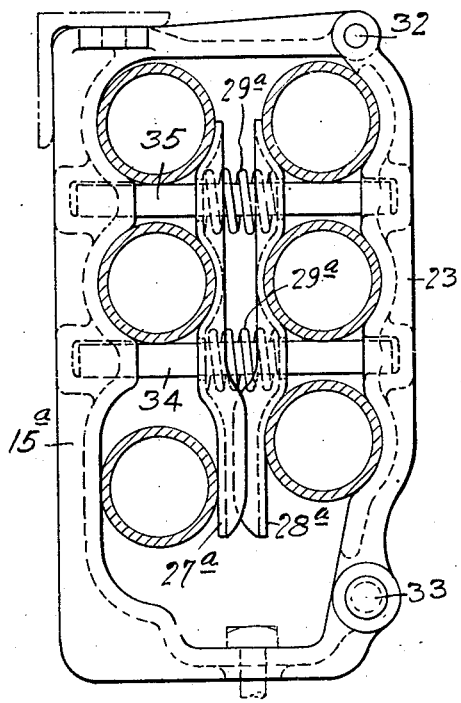
Figure 8:
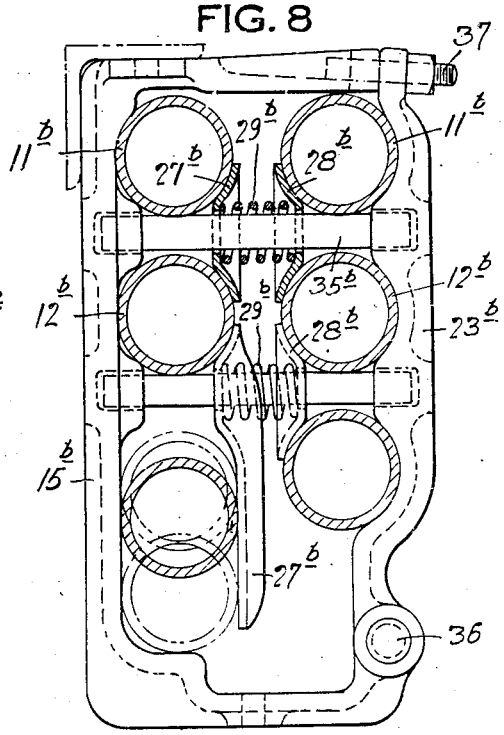
Figure 9:
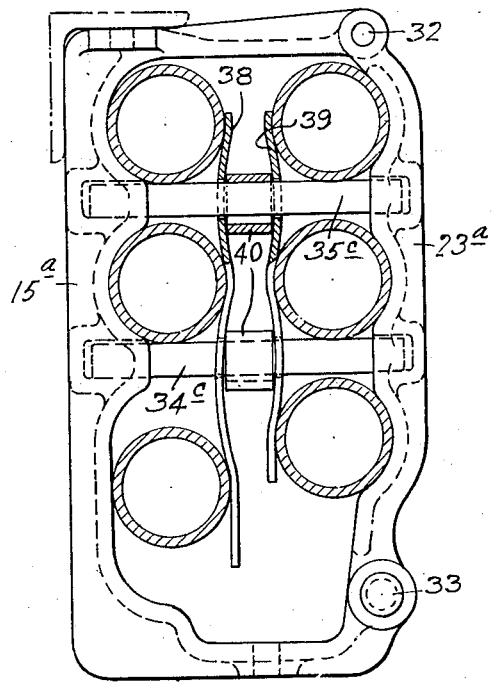
Figure 10:
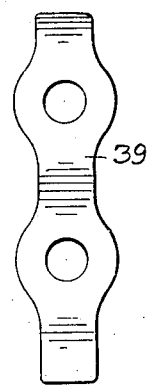

Some of the forms which our invention may take are shown in the accompanying drawing, wherein Fig. 1 is a side elevational view of a bracket embodying our invention, showing a group of pipes positioned therein; Fig. 2 is a front elevational view thereof; Fig. 3 is a plan view; Fig. 4 is a view taken on the line 4—4 of Fig. 1; Fig. 5 is a view taken on the line 5—5 of Fig. 1; Fig. 6 is a detail view showing the manner in which the pipe clamping bars are interconnected to limit relative movement thereof; Fig. 7 is a side elevational view of a modified form of bracket structure; Fig. 8 is a similar view showing a third modification; Fig. 9 shows a fourth form which the bracket may take, and Fig. 10 is a front view of one of the spring bars of Fig. 9.

For the purpose of convenience, we have shown our bracket as employed in supporting a group of steam pipes such as serve to heat railway cars. These pipes are numbered on the drawing as 11, 12, 13 and 14. The bracket is composed of a fixed member 15 that may be secured to the side of the car (not shown), through the medium of an angle iron 16 or in any other suitable manner. The bracket member 15 is provided with two shelf-like portions 17 and 18 for supporting two of the pipes. Beneath the shelf 18 sufficient space is provided so that the pipe 13 may be supported in various spaced relations to the pipe 12 thereabove, since in many installations the spacing between these two pipes is not the same as the spacing between the two upper pipes of the rear row.

The bracket 15 is provided with outwardly extending arms 19 and 20 that support bolts 21 and 22, respectively. These bolts in turn support a front bracket member 23 through which the bolts 21 and 22 extend. The bracket member 23 is provided with shelf-like portions 24, 25 and 26 for supporting the outer row of pipes 11—12 and 14.

The shelves 17, 18, 24 and 25 are provided with vertical slots within which lie clamping bars 27 and 28. The slots prevent displacement of these bars longitudinally of the pipes. Springs 29 are disposed between the bars 27 and 28, to hold said bars in yielding engagement with said pipes. The tension of the springs may be depended upon to hold the pipe 13 in proper vertical position, or such pipe may be vertically supported in any other desired manner.

It will be seen that upon movement of any of the pipes, as by expansion under the action of heat, they move longitudinally without any restraint, save for the frictional contact with the bars 27 and 28, and may have lateral movement against the tension of the springs 29. By this arrangement the pipes are prevented from rattling or chattering on their supports, but are nevertheless permitted to freely expand and contract.

In order to remove the pipes, it is necessary only to take the nuts off the bolts 21 and 22 and lift out the bracket member 23. The outer pipes can then be removed after which the clamping bars 27 and 28 may be taken out, to permit removal of the rear row of pipes. The bracket arms 27 has laterally turned ends 30 and the clamping bar 28 is bifurcated at each end to provide projections 31 that have interlocking relation with the projections 30, as shown more clearly in Figs. 1 and 6, to limit the expanding movement of the bars 27 and 28 under the action of the springs 29. This arrangement serves to maintain the bars and springs in assembled relation when removed from the bracket.

In Fig. 7 we have shown a bracket of modified form, wherein a rear bracket member 15ª and a front bracket member 23ª are provided. The front bracket member has hinged connection at 32 with the bracket member 15ª and at its lower end may be detachably connected to a rear bracket member by a pin or bolt 33. The bracket members 15ª and 23ª are each provided with sockets for supporting opposite ends of pins 34 and 35. These pins extend through perforations in the clamping bars 27ª and 28ª. The bars 27ª and 28ª, in conjunction with the springs 29ª, serve to hold the pipes in their seats against the brackets 15ª and 23ª, respectively, as in the case of the structure of Fig. 1.

Referring to Fig. 8, the brackets 15ᵇ and 23ᵇ are connected by a hinge 36 and a bolt 37 and are also provided with sockets for supporting the ends of pins 34ᵇ and 35ᵇ that extend through the coil springs 29ᵇ. Instead of a single clamping bar for each vertical group of pipes, this view shows a pair of front clamping bars or blocks 28ᵇ and rear clamping blocks 27ᵇ. The lower block 27ᵇ is extended to permit engagement thereof with the lowermost pipe which may be located at various vertical distances from the pipe thereabove, as indicated in dotted lines. By this arrangement each pipe is yieldably restrained against movement at all times, regardless of the position occupied by adjacent pipes. Thus, pipes 11ᵇ may move inward against the tension of the upper spring 29ᵇ, but during such movement the lower ends of the upper blocks 27ᵇ and 28ᵇ will be maintained against the pipes 12ᵇ. The upper blocks 27ᵇ and 28ᵇ have sufficient clearance with respect to the pin 35ᵇ that they may tilt slightly. On the other hand, if either of the pipes 12ᵇ moves inwardly from the position shown, the upper ends of the blocks 27ᵇ and 28ᵇ will not be moved inward but will remain in yieldable engagement with the pipes 11ᵇ.

In Fig. 9 we have shown a structure similar to that of Fig. 7, but wherein the coil springs are dispensed with. In this structure the pins 34ᶜ and 35ᶜ are supported in the front and rear bracket castings, and extend through leaf spring members 38 and 39 that serve as clamping bars for the pipes. Spacing sleeves 40 are provided between the spring arms 38 and 39 so that said springs will be tensioned by deflection in the manner shown, when the parts are assembled as in Fig. 9.

It will be understood that our invention is not limited to use with steam pipes or to employment with members which are subjected to movement under changes in temperature, but that it may be employed in supporting one or more members which are of irregular form or irregulaly spaced.

The clamping bars and brackets are provided with curved seats for the pipes 11, 12, 14, etc., so that said pipes will be snugly held in position, but may nevertheless move vertically under abnormal conditions and be returned again to their seats under the action of the springs or by gravity, or both.

The invention may also be employed for supporting only a single row of pipes, either vertically or horizontally spaced, and for various other arrangements of piping.

We claim as our invention:

1. A pipe bracket comprising a rear seating member and a front seating member each adapted to support a pipe by engagement with one side thereof, at a point intermediate its ends, and resilient means adapted to be mounted between said seating members and yieldable laterally thereof, for holding a pipe in engagement with each of said members.

2. A pipe bracket comprising a rear seating member and a front seating member each adapted to support a pipe by engagement with one side thereof, at a point intermediate its ends, and resilient means adapted to be mounted between said seating members and yieldable laterally thereof, for holding a pipe in engagement with each of said members, the second-named member being detachably connected to said first-named member.

3. Pipe bracket structure comprising a seating member having a plurality of curved seating surfaces for pipes disposed in transverse alinement, and a yieldable member for holding pipes in position in said seats and arranged to extend transversely of said pipes, each of the said curved surfaces partially embracing a pipe, for a distance less than one-half the circumference of the pipe contained therein, to permit independent movement of said pipes longitudinally of said yieldable member.

In testimony whereof we, the said GRIFFITH W. LINDSAY, and HJALMAR NORDENMALM, have hereunto set our hands.

GRIFFITH W. LINDSAY.
HJALMAR NORDENMALM.